United States Patent Office 3,822,269
Patented July 2, 1974

3,822,269
6 - AMINOALKYLAMINO-HEXAHYDROPHEN-ANTHRIDINES USEFUL AS ANTIARRHYTHMIC AGENTS
Claude Jeanmart, Brunoy, Mayer Naoum Messer, Bievres, and Pierre Simon, Montrouge, France, assignors to Rhone-Poulenc S.A., Paris, France
No Drawing. Filed July 6, 1972, Ser. No. 269,469
Claims priority, application France, July 8, 1971, 7124995
Int. Cl. C07d 39/02
U.S. Cl. 260—286 A                 7 Claims

ABSTRACT OF THE DISCLOSURE 1,2,3,4,4a,10b - Hexahydrophenanthridine derivatives with an aminoalkylamino substituent —NH—A—NR$_1$R$_2$ (wherein A is alkylene of 1 through 5 carbon atoms and —NR$_1$R$_2$ is dialkylamino or a 5- or 6-membered mononuclear heterocyclic group) in the 6-position of the phenanthridine ring possess pharmacodynamic properties and are especially useful as antiarrhythmic agents.

---

This invention relates to new therapeutically useful phenanthridine derivatives, to a process for their preparation and pharmaceutical compositions containing them.

The new phenanthridine derivatives of the present invention are those of the general formula:

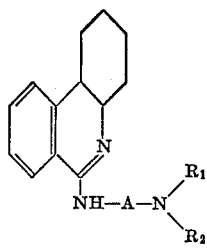

I (wherein symbol A represents a straight- or branched-chain alkylene radical of 1 to 5 carbon atoms, and the symbols R$_1$ and R$_2$ each represent the same or a different alkyl radical containing 1 to 5 carbon atoms, or the symbols R$_1$ and R$_2$ together with the nitrogen atom to which they are attached represent a 5- or 6-membered mononuclear heterocyclic group, optionally containing a second hetero atom selected from nitrogen, oxygen and sulphur atoms, for example a 1-pyrrolidinyl, piperidino, 1-piperazinyl or morpholino radical) and acid addition and quaternary ammonium salts thereof.

Preferred compounds of the present invention are those of general formula I wherein A represents an alkylene radical containing 2 or 3 carbon atoms, more especially an ethylene radical in which the carbon atom attached to the group —NR$_1$R$_2$ carries a methyl substituent, and particularly those wherein R$_1$ and R$_2$ both represent ethyl radicals or together with the nitrogen atom to which they are attached represent a 1-pyrrolidinyl group, and especially 6-(2 - diethylamino - propylamino)-1,2,3,4,4a,10b-hexahydrophenanthridine and acid addition and quaternary ammonium salts thereof.

According to a feature of the invention, the phenanthridine derivatives of general formula I are obtained by the process which comprises reaction of an amine of the general formula:

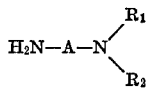

II (wherein A, R$_1$ and R$_2$ are as hereinbefore defined) with a phenanthridine derivative of the general formula:

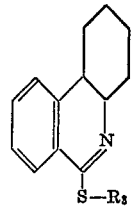

III (wherein R$_3$ represents an alkyl radical containing 1 to 3 carbon atoms, preferably the methyl radical) or an acid addition salt thereof, preferably the hydriodide.

When the phenanthridine starting material of general formula III is used in the form of the free base, the reaction is preferably effected by heating the reactants in an inert organic solvent, for example ethanol, toluene or dimethylformamide, at a temperature between 50° and the boiling point of the reaction mixture. It is particularly advantageous to carry out the reaction under an inert atmosphere such as a nitrogen atmosphere. The reaction is generally complete after a period of heating of between 10 and 30 hours.

When the starting material of general formula III is used in the form of an acid addition salt, it is preferable to carry out the reaction in an alcohol, for example ethanol, and at a temperature between 50° and 80° C. for 30 minutes to 10 hours.

The phenanthridine derivatives of general formula III can be prepared by cyclisation of an isothiocyanate of the general formula:

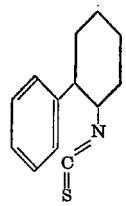

IV followed by S-alkylation by methods known per se of the resulting 1,2,3,4,4a,5,6,10b-octahydrophenanthridine - 6-thione. By the term "methods known per se" as used in this specification is meant methods heretofore used or described in the chemical literature. The cyclisation of the isothiocyanate is generally carried out by heating in sulphuric acid or polyphosphoric acid, or by the action of aluminium chloride in n-heptane.

The phenanthridine derivatives of general formula I obtained by the aforementioned process can be purified by physical methods such as distillation, crystallisation or chromatography, or by chemical methods such as the formation of salts, crystallisation of the salts and decomposition of them in an alkaline medium. In carrying out the said chemical method the nature of the anion of the salt is immaterial, the only requirement being that the salt must be well-defined and readily crystallisable.

The phenanthridine derivatives of general formula I may be converted by methods known per se into acid addition and quaternary ammonium salts. The acid addition salts may be obtained by the action of acids on the phenanthridine derivatives in appropriate solvents. As organic solvents there may be used alcohols, ethers, ketones or chlorinated hydrocarbons. The salt which is formed is precipitated, if necessary after concentration of the solution, and is isolated by filtration or decantation. The quaternary ammonium salts may be obtained by the action of esters on the phenanthridine bases, optionally in an organic solvent, at room temperature or, more rapidly, with gentle heating.

The phenanthridine derivatives of the present invention, and their acid addition and quaternary ammonium salts, possess interesting pharmacodynamic properties; they are very active as anti-arrhythmic agents. *In vitro*, at concentrations of between 1 and 10 mg./litre, they have proved active in a study of the prolongation of the refractory period of the isolated auricles of the rabbit [G. S. Dawes, Brit. J. Pharmacol., 1, 90 (1946)]. *In vivo*, the products have proved active in rabbits against electrocardiographic abnormalities caused by aconitine, and in guinea pigs against the cardiac toxicity of ouabain [A. Seyika and E. M. Vaughan Williams, Brit. J. Pharmacol., 21, 462 (1963)] at doses of between 0.5 and 10 mg./kg. animal body weight administered intravenously.

For therapeutic purposes, the phenanthridine derivatives of general formula I may be employed as such or in the form of non-toxic acid addition salts, i.e. salts containing anions which are relatively innocuous to the animal organism in therapeutic doses of the salts (such as hydrochlorides, sulphates, nitrates, phosphates, acetates, propionates, succinates, benzoates, fumarates, maleates, tartrates, theophyllineacetates, salicylates, phenolphthalinates and methylene - bis - $\beta$ - hydroxynaphthoates) so that the beneficial physiological properties inherent in the bases are not vitiated by side-effects ascribable to the anions. They may also be employed in the form of non-toxic quaternary ammonium salts obtained by reaction with organic halides, e.g. methyl, ethyl, allyl or benzyl chloride, bromide or iodide, or other reactive esters, e.g. methyl- or ethyl-sulphates, benzenesulphonates or toluene-*p*-sulphonates.

The following Examples illustrate the preparation of phenanthridine derivatives of the present invention.

EXAMPLE 1

A solution of 6-methylthio-1,2,3,4,4a,10b-hexahydrophenanthridine hydriodide (20.1 g.), 2-diethyl aminoethylamine (6.8 g.) and 57% hydriodic acid (7.4 cc.) in ethanol (200 cc.) is heated under reflux for 3 hours. After cooling, a product crystallises which is filtered off and washed with ethanol (3× 20 cc.) After drying, a product (25 g.), melting at 252–254° C. with decomposition, is obtained. Recrystallisation from ethanol (1,340 cc.) yields 6-(2-diethylaminoethylamino)-1,2,3,4,4a,10b-hexahydrophenanthridine dihydriodide (22.9 g.), melting at 256–258° C. with decomposition.

6-Methylthio-1,2,3,4,4a,10b - hexahydrophenanthridine hydriodide employed as starting material can be obtained by heating a suspension of 1,2,3,4,4a,5,6,10b-octahydrophenanthridine-6-thione (37.6 g.) in methyl iodide (376 cc.). The mixture is heated under reflux for one hour after the product has dissolved, which happens at the reflux temperature. A yellow product crystallises, which is filtered off after cooling. It is washed with acetone (100 cc.) and then dried to yield 6-methylthio-1,2,3,4,4a,10b-hexahydrophenanthridine hydriodide (47 g.) melting at 230–232° C. with decomposition.

1,2,3,4,4a,5,6,10b-Octahydrophenanthridine - 6 - thione can be prepared by adding gradually, over a period of 20 minutes, 1-isothiocyanato-2-phenyl-cyclohexane (47.5 g.) to a solution of water (4.2 cc.) in sulphuric acid ($d$=1.83; 140.4 cc.), whilst maintaining the temperature at about 28° C. The orange solution is stirred for a further 2 hours at 34° C., and then the reaction mixture is poured into ice-water (420 cc.). A yellow product crystallises and is filtered off. It is then washed with distilled water (1,200 cc.) and dried in air to yield 1,2,3,4,4a,5,6,10b-octahydrophenanthridine-6-thione (41 g.), melting at 212–213° C.

1-Isothiocyanato-2-phenyl-cyclohexane can be prepared by gradually adding aqueous sodium hydroxide ($d$=1.33; 59 cc.), so as to maintain the pH at about 5–6, to a mixture of thiophosgene (23.6 g.) in methylene chloride (210 cc.) and 2-phenyl-cyclohexylamine hydrochloride (42 g.) in water (210 cc.). When the reaction is finished, the organic phase is decanted. The aqueous phase is extracted with methlene chloride (50 cc.) and the combined organic extracts are washed with water (50 cc.) and then dried over sodium sulphate. The volatile products are removed under reduced pressure and 1-isothiocyanato-2-phenylcyclohexane (47.5 g.), in the form of a light orange oil, is obtained.

2-Phenyl-cyclohexylamine hydrochloride can be prepared according to the process described by J. Von Braun et al., Ber. 55, 3671 (1922).

EXAMPLE 2

A solution of 6-methylthio-1,2,3,4,4a,10b-hexahydrophenanthridine hydriodide (22.5 g.), 2-(1-pyrrolidinyl)-ethylamine (7.6 g.) and 57% hydriodic acid (14.2 g.) in ethanol (225 cc.) is heated under reflux for 3 hours. After cooling, a product crystallises which is filtered off and washed with ethanol (3× 15 cc.). After drying, a product (28.5 g.) melting at 248–250° C. is obtained. Recrystallisation from ethanol (750 cc.) yields 6-[2-(1-pyrrolididinyl) - ethylamino] - 1,2,3,4,4a,10b - hexahydrophenanthridine dihydriodide (22 g.) melting at 248–250° C.

2-(1-Pyrrolidinyl)-ethylamine can be prepared according to J. Van Alphen, Rec. Trav. Chim., 58, 1105 (1939).

EXAMPLE 3

A solution of 6-methylthio-1,2,3,4,4a,10b-hexahydrophenanthridine hydriodide (28.6 g.), 2-diethyl-aminopropylamine (10.9 g.) and 57% hydriodic acid (17.9 g.) in ethanol (290 cc.) is heated under reflux for 3 hours. After cooling, a product crystallises which is filtered off and washed with ethanol (4× 20 cc.) and then with anaesthetic grade diethyl ether (2× 20 cc.). After drying, a product (29.5 g.), melting at 262–263° C., is obtained. Recrystallisation from ethanol (1,800 cc.) yields 6 - (2 - diethylamino-propylamino)-1,2,3,4,4a,10b-hexahydrophenanthridine dihydriodide (20.8 g.) melting at 266° C.

The present invention includes within its scope pharmaceutical compositions which comprise, as active ingredient, at least one of the phenanthridine derivatives of general formula I, or a non-toxic acid addition or quaternary ammonium salts thereof, in association with a pharmaceutically-acceptable carrier or coating. The invention includes especially such preparations made up for oral, parenteral or rectal administration or local application, e.g. as ointments.

Solid compositions for oral administration include tablets, pills, powders and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening and flavouring substances. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils such as olive oil and injectable organic esters such as ethyl oleate. These compositions may also contain adjuvants such as preserving, wetting, emulsifying and dispersing agents. They may be sterilised by, for example, filtration through a bacteriaretaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions when administered orally to an adult should generally give doses between 100 mg. and 1,000 mg. of active substance per day. In general, the physician will decide the posology considered appropriate, taking into account the age and weight and other factors intrinsic to the patient being treated.

The following Example illustrates pharmaceutical compositions according to the invention.

EXAMPLE 4

Tablets containing 25 mg. of active product and having the following composition are prepared according to the usual technique:

| | G. |
|---|---|
| 6-(2-diethylamino - ethylamino) - 1,2,3,4,4a,10b-hexahydrophenanthridine dihydroiodide | 0.046 |
| Starch | 0.081 |
| Precipitated silica | 0.020 |
| Magnesium stearate | 0.003 |

We claim:

1. A phenanthridine of the formula:

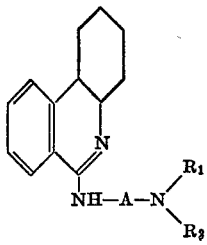

wherein A is saturated alkylene of 1 through 5 carbon atoms, and $R_1$ and $R_2$, when taken singly, are each alkyl of 1 through 5 carbon atoms, or $R_1$ and $R_2$ together with the nitrogen atom to which they are attached represent 1-pyrrolidinyl or piperidino, and non-toxic pharmaceutically-acceptable acid addition salts thereof.

2. A phenanthridine according to Claim 1 wherein A is saturated alkylene of 2 or 3 carbon atoms.

3. A phenanthridine according to Claim 1 wherein A is ethylene and the carbon atom attached to the group —$NR_1R_2$ carries a methyl.

4. A phenanthridine according to Claim 1 wherein $R_1$ and $R_2$ are both ethyl or together with the nitrogen atom to which they are attached represent 1-pyrrolidinyl.

5. The phenanthridine according to Claim 1 which is 6-(2-diethylamino-propylamino) - 1,2,3,4,4a,10b - hexahydrophenanthridine and non-toxic pharmaceutically-acceptable acid addition salts thereof.

6. The phenanthridine according to Claim 1 which is 6-(2 - diethylamino-ethylamino) - 1,2,3,4,4a,10b - hexahydrophenanthridine and non-toxic pharmaceutically-acceptable acid addition salts thereof.

7. The phenanthridine according to Claim 1 which is 6-[2-(1-pyrrolidinyl)-ethylamino] - 1,2,3,4,4a,10b - hexahydrophenanthridine and non-toxic pharmaceutically-acceptable acid addition salts thereof.

References Cited
UNITED STATES PATENTS

| 3,243,438 | 3/1966 | Hellerbach | 260—286 A |
| 3,567,727 | 3/1971 | Barber | 260—286 A |
| 3,644,366 | 2/1972 | Jeanmart | 260—283 SY |

DONALD G. DAUS, Primary Examiner

U.S. Cl. X.R.

260—243 B, 256, 247.5 B, 268 BQ, 268 TR, 283 SY, 283 S, 286 Q, 288 A, 454; 424—258